United States Patent
Aoi et al.

(10) Patent No.: US 11,027,746 B2
(45) Date of Patent: Jun. 8, 2021

(54) DRIVE MODE SWITCHING CONTROL DEVICE, METHOD AND PROGRAM

(71) Applicant: OMRON Corporation, Kyoto (JP)

(72) Inventors: Hatsumi Aoi, Kyotanabe (JP); Tomoyoshi Aizawa, Kyoto (JP); Kazuyoshi Okaji, Ohmihachiman (JP); Hiroshi Sugahara, Kyoto (JP); Michie Uno, Tokyo (JP); Koji Takizawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 87 days.

(21) Appl. No.: 16/488,958

(22) PCT Filed: Dec. 12, 2017

(86) PCT No.: PCT/JP2017/044489
§ 371 (c)(1),
(2) Date: Aug. 27, 2019

(87) PCT Pub. No.: WO2018/163553
PCT Pub. Date: Sep. 13, 2018

(65) Prior Publication Data
US 2019/0375428 A1    Dec. 12, 2019

(30) Foreign Application Priority Data

Mar. 9, 2017  (JP) .............................. JP2017-045229

(51) Int. Cl.
*B60W 50/12* (2012.01)
*B60W 40/12* (2012.01)
(Continued)

(52) U.S. Cl.
CPC ............ *B60W 50/12* (2013.01); *B60W 40/12* (2013.01); *G05D 1/0061* (2013.01);
(Continued)

(58) Field of Classification Search
CPC ................................................. B60W 60/0059
See application file for complete search history.

(56) References Cited

U.S. PATENT DOCUMENTS

| 2013/0226408 A1* | 8/2013 | Fung | ........................ A61B 5/18 |
| | | | 701/41 |
| 2015/0149021 A1* | 5/2015 | Duncan | ................. B60W 30/12 |
| | | | 701/23 |

(Continued)

FOREIGN PATENT DOCUMENTS

| JP | H11-198839 A | 7/1999 |
| JP | H11-208498 A | 8/1999 |

(Continued)

OTHER PUBLICATIONS

An English Translation of the International Search Report("ISR") of PCT/JP2017/044489 dated Feb. 27, 2018.

(Continued)

*Primary Examiner* — Christian Chace
*Assistant Examiner* — Amelia Vorce
(74) *Attorney, Agent, or Firm* — Metrolex IP Law Group, PLLC

(57) ABSTRACT

A driver state determination unit of a drive mode switching control device regularly or irregularly determines whether a driver's state is a state of being able to perform a driving operation in a manual drive mode. The drive mode switching control device determines whether an operation performed by the driver is an emergency override operation or a non-emergency override operation. The drive mode switching control device outputs a switching signal for switching an automatic drive mode to the manual drive mode when a determination result by the driver state determination unit immediately before detection of the emergency override (Continued)

operation is that a driver's state is a state of being able to perform a driving operation in the manual drive mode.

15 Claims, 5 Drawing Sheets

(51) Int. Cl.
  *G05D 1/00* (2006.01)
  *G06K 9/00* (2006.01)
  *B60W 50/00* (2006.01)
(52) U.S. Cl.
  CPC ....... *G05D 1/0088* (2013.01); *G06K 9/00832* (2013.01); *B60W 2050/0073* (2013.01); *B60W 2520/105* (2013.01); *B60W 2540/26* (2013.01); *B60W 2556/00* (2020.02)

(56) References Cited

U.S. PATENT DOCUMENTS

| | | | |
|---|---|---|---|
| 2016/0207536 A1 | 7/2016 | Yamaoka et al. | |
| 2017/0028995 A1* | 2/2017 | Mori | B60Q 9/008 |
| 2017/0032200 A1* | 2/2017 | Schmidt | B60Q 9/00 |
| 2017/0261981 A1* | 9/2017 | Ichikawa | B60W 50/14 |
| 2017/0261982 A1* | 9/2017 | Otaki | B60W 50/08 |
| 2018/0154903 A1* | 6/2018 | Song | B60W 50/12 |
| 2018/0231976 A1* | 8/2018 | Singh | B60W 30/12 |
| 2018/0370546 A1* | 12/2018 | Augst | B60K 26/021 |
| 2018/0373244 A1* | 12/2018 | Augst | B60W 30/10 |

FOREIGN PATENT DOCUMENTS

| | | |
|---|---|---|
| JP | 2016-132351 A | 7/2016 |
| JP | 2016-151815 A | 8/2016 |
| JP | 2016-159781 A | 9/2016 |

OTHER PUBLICATIONS

The Written Opinion("WO") of PCT/JP2017/044489 dated Feb. 27, 2018.

The International Preliminary Report on Patentability (Chapter II of the Patent Cooperation Treaty) ("IPEA/409") of PCT/JP2017/044489 dated Sep. 14, 2018.

* cited by examiner

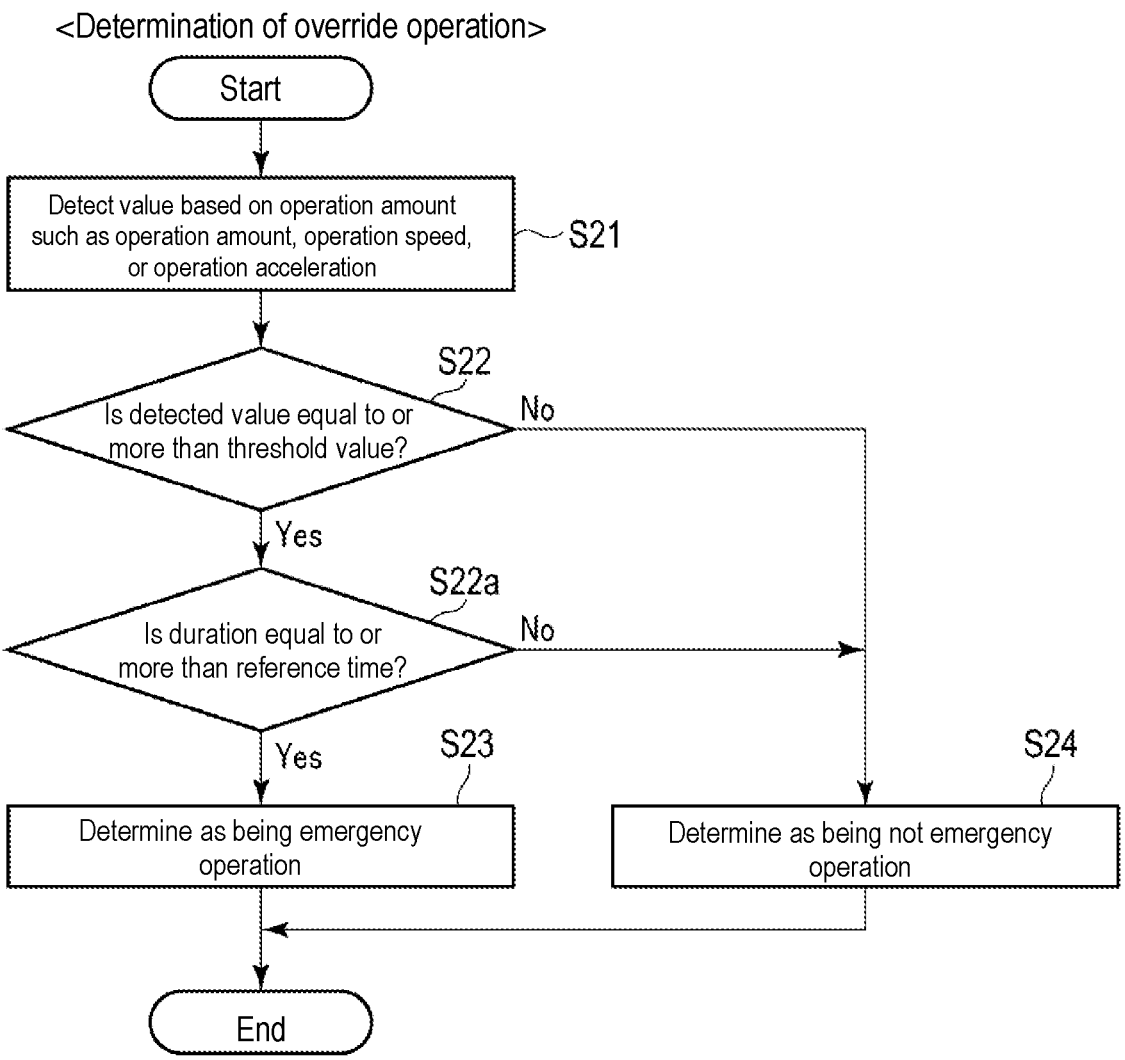

DRIVE MODE SWITCHING CONTROL DEVICE, METHOD AND PROGRAM

TECHNICAL FIELD

The present invention relates to a drive mode switching control device, a method, and a program for switching a drive mode of a vehicle between a manual drive mode and an automatic drive mode.

BACKGROUND ART

In recent years, as a drive mode of a vehicle, in addition to a manual drive mode in which the vehicle is driven based on a driver's driving operation, development of an automatic drive mode is in progress in which the vehicle is driven along a preset route regardless of the driver's driving operation. The automatic drive mode is to enable an automatic driving of the vehicle by controlling a power unit, a steering device, a brake, and the like, based on, for example, information of a navigation system using a global positioning system (GPS), traffic information acquired through road-to-vehicle communication, and information of a surrounding monitoring system that monitors a position and movement of surrounding people and vehicles.

Meanwhile, although the automatic drive mode can be expected to have effects such as reducing a driver's burden of a driving operation and alleviating traffic congestion, it is practically difficult to automate all driving operations from the start of driving to the end of driving. Therefore, there is a need for appropriately switching from the automatic drive mode to the manual drive mode. As a trigger for switching the automatic drive mode to the manual drive mode, for example, there is a driving operation (hereinafter referred to as an override operation) by the driver during the automatic driving (see, for example, JP 2016-151815 A). When the override operation is detected, it is necessary to detect a driver's state and determine that a manual driving operation is possible before switching.

However, according to the study of the inventor, although the above switching does not usually cause any particular problem, there is room for improvement in uniform handling of the override operation without classifying cases.

For example, the override operation may be a misoperation, a non-emergency operation, or an emergency operation. Here, in a case of an emergency operation, a driver's state is to be detected and determined prior to the switching despite the driver's desire for quick switching. This may prolong a time from an emergency operation until switching to the manual drive mode, to delay the start of a manual operation by the driver. On the other hand, in a case of an erroneous operation or a non-emergency operation, it is not necessary to quickly switch to the manual drive mode, and it is only necessary that a driver's state can be detected and determined prior to the switching.

That is, since the conventional switching is handled uniformly without classifying a case of an emergency operation and a case of other operations, there is room for improvement in that a time required for switching may be long in a case of an emergency override operation.

An object of the present invention is to provide a drive mode switching control device, a method, and a program that can shorten a time from an override operation until switching to a manual drive mode in a case of an emergency override operation.

SUMMARY OF THE INVENTION

In order to solve the above-mentioned problem, a first aspect of the present invention is a drive mode switching control device for switching a drive mode of a vehicle from an automatic drive mode to a manual drive mode. The drive mode switching control device includes: an acquisition unit to acquire sensing data representing a state of a driver from a monitoring sensor that is for monitoring of a state of the driver; a driver state determination unit to regularly or irregularly determine, based on the acquired sensing data, whether or not a state of the driver is a state of being able to perform a driving operation in the manual drive mode, and to hold a determination result thereof; an operation determination unit to determine whether an operation performed by the driver is an emergency override operation or a non-emergency override operation, based on a detection signal outputted from an in-vehicle sensor capable of detecting a driving operation by the driver; a first switching signal output unit to output a switching signal for switching the automatic drive mode to the manual drive mode when a determination result by the driver state determination unit immediately before detection of the emergency override operation is that a state of the driver is a state of being able to perform a driving operation in the manual drive mode, in a case where a determination result by the operation determination unit is the emergency override operation; and a second switching signal output unit to output the switching signal when a determination result by the driver state determination unit after detection of a non-emergency override operation is that a state of the driver is a state of being able to perform a driving operation in the manual drive mode, in a case where a determination result by the operation determination unit is the non-emergency override operation.

According to the first aspect of the present invention, it is regularly or irregularly determined whether or not a state of the driver is a state of being able to perform a driving operation in the manual drive mode; it is determined whether an operation performed by the driver is an emergency override operation or a non-emergency override operation; and a switching signal for switching the automatic drive mode to the manual drive mode is outputted when a determination result by the driver state determination unit immediately before detection of the override operation is that a state of the driver is a state of being able to perform a driving operation in the manual drive mode, in a case where a determination result by the operation determination unit is the emergency override operation. This eliminates necessity of a time for detecting and determining a driver's state after the emergency override operation, enabling reduction of a time from the emergency override operation until outputting a signal for switching to the manual drive mode. Further, in a case where an operation of the driver is the non-emergency override operation, it is determined whether or not a driver's state is a state of being able to perform a driving operation after this point of time, and a drive mode switching signal is outputted based on a determination result thereof. Therefore, it is possible to switch from the automatic drive mode to the manual drive mode after confirming the latest state of the driver.

A second aspect of the present invention is made such that, the operation determination unit includes a first detector, a second detector, and a threshold determination unit; the first detector detects an override operation by the driver based on the detection signal; the second detector detects a value based on an operation amount of the driving operation based on the detection signal; and the threshold determination unit determines whether or not an override operation detected by the first detector is an emergency operation, in accordance with whether or not a value based on an operation amount detected by the second detector is equal to or more than a threshold value.

According to the second aspect of the present invention, an override operation by the driver is detected, a value based on an operation amount of the driving operation is detected, and it is determined whether or not an override operation is an emergency operation in accordance with whether or not a value based on the operation amount is equal to or more than a threshold value. This enables discrimination as to whether or not an override operation is an emergency operation in accordance with magnitude of a value based on the operation amount of the driving operation.

A third aspect of the present invention is made such that the threshold determination unit determines that an override operation detected by the first detector is an emergency operation when a value based on the operation amount is equal to or more than the threshold value, and duration in which a value based on the operation amount has been equal to or more than the threshold value is equal to or more than a reference time.

According to the third aspect of the present invention, it is determined that the override operation is an emergency operation when a value based on the operation amount is equal to or more than a threshold value, and duration in which a value based on the operation amount has been equal to or more than the threshold value is equal to or more than a reference time. This enables determination (detection) of an emergency operation continued for the reference time or more, as the emergency override operation.

A fourth aspect of the present invention is made such that the threshold determination unit determines that an override operation detected by the first detector is not an emergency operation when a value based on the operation amount is equal to or more than the threshold value, and duration in which a value based on the operation amount has been equal to or more than the threshold value is less than a reference time.

According to the fourth aspect of the present invention, it is determined that the override operation is not an emergency operation when a value based on the operation amount is equal to or more than the threshold value, and duration in which a value based on the operation amount has been equal to or more than the threshold value is less than a reference time. This eliminates detection of a temporary erroneous operation caused, for example, by the driver's elbow colliding with a steering wheel for a moment, as an emergency override operation.

A fifth aspect of the present invention is made such that the threshold determination unit determines that an override operation detected by the first detector is not an emergency operation when a value based on the operation amount is less than the threshold value.

According to the fifth aspect of the present invention, it is determined that an override operation detected by the first detector is not an emergency operation when a value based on the operation amount is less than the threshold value. This can give time allowance for newly confirming the propriety of manual driving, when the driver slowly and carefully performs the override operation.

A sixth aspect of the present invention is made such that a value based on the operation amount is to be at least one of: an operation amount value of the driving operation; an operation speed value obtained by differentiating an operation amount of the driving operation once; or an operation acceleration value obtained by differentiating an operation amount of the driving operation twice.

According to the sixth aspect of the present invention, as a value based on the operation amount, there is used a value at least one of: an operation amount value of the driving operation; an operation speed value obtained by differentiating an operation amount of the driving operation once; or an operation acceleration value obtained by differentiating an operation amount of the driving operation twice. This enables determination as to whether or not an override operation is an emergency operation based on a specific numerical value.

That is, according to each aspect of the present invention, it is possible to provide a drive mode switching control device, a method, and a program that can shorten a time from an override operation until switching to the manual drive mode in a case of an emergency override operation.

BRIEF DESCRIPTION OF THE DRAWINGS

FIG. 5 is a flowchart showing another procedure and control contents of the flow shown in FIG. 4.

MODE FOR CARRYING OUT THE INVENTION

Hereinafter, an embodiment according to the present invention will be described with reference to the drawings.

One Embodiment

Figure 1:
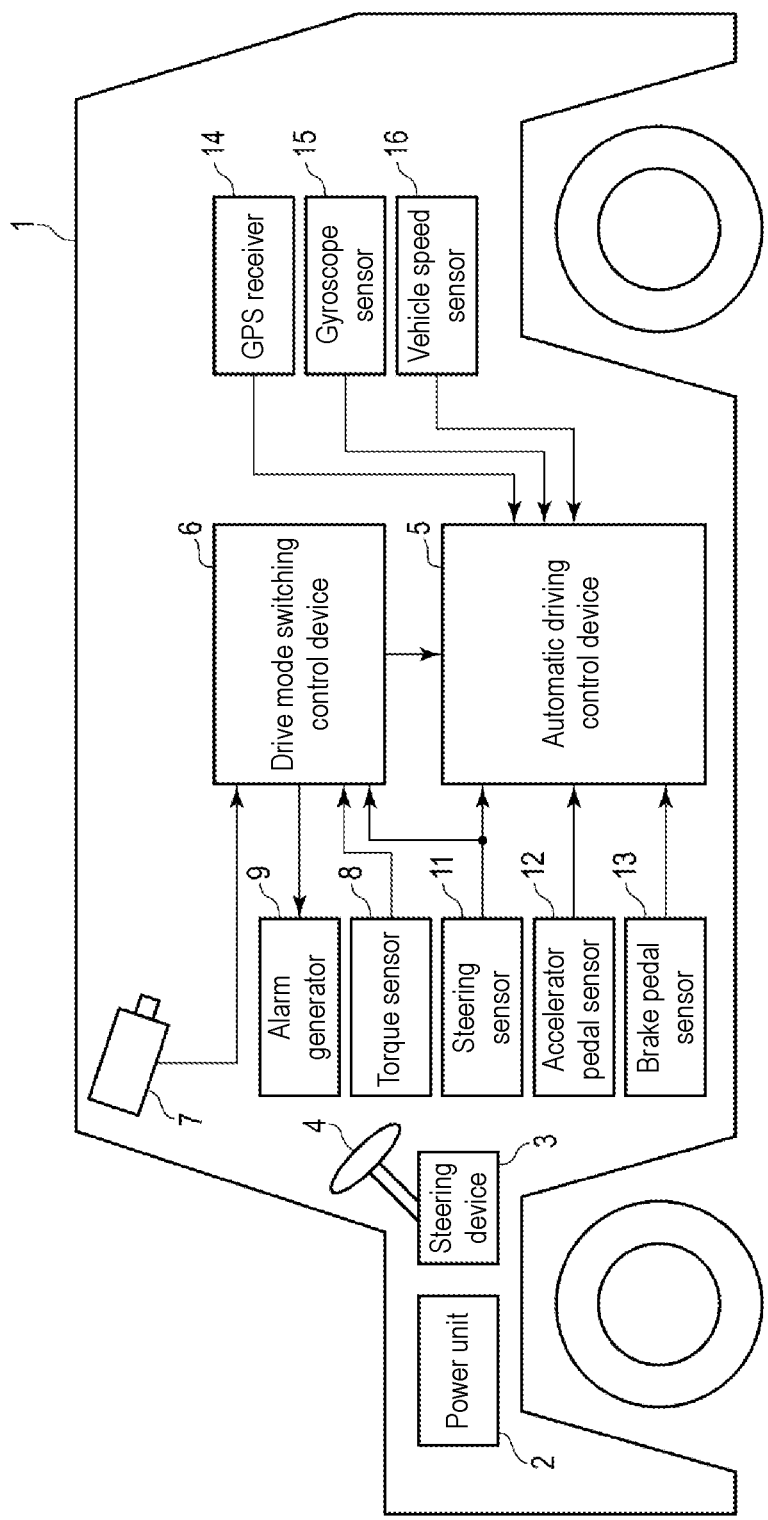
FIG. 1 is a diagram showing an overall configuration of an automatic driving control system provided with a drive mode switching control device according to one embodiment of the present invention.

FIG. 1 is a diagram showing an overall configuration of an automatic driving control system provided with a drive mode switching control device according to one embodiment of the present invention. This automatic driving control system is mounted on a vehicle 1 such as a passenger car.

The vehicle 1 includes, as basic equipment, a power unit 2 including a power source and a transmission, and a steering device 3 equipped with a steering wheel 4. Moreover, the vehicle 1 is provided with a manual drive mode and an automatic drive mode as drive modes. As the power source, an engine, a motor, or both are used.

The manual drive mode is, for example, a mode for causing the vehicle 1 to travel mainly by a manual driving operation by a driver. The manual drive mode includes, for example, a drive mode for causing the vehicle to travel on the basis only on the driver's driving operation, and a drive mode for performing driving-operation support control for assisting the driver's driving operation while the driver's driving operation is mainly performed.

The driving-operation support control assists, for example, a steering torque such that driver's steering becomes an appropriate steering amount based on a curvature of a curve during curve traveling of the vehicle 1. In addition, the driving-operation support control includes control for assisting a driver's accelerator operation (for example, an operation on an accelerator pedal) or a brake operation (for example, an operation on a brake pedal), and manual steering (manual driving for steering) and manual speed adjustment (manual driving for speed adjustment). In the manual steering, steering of the vehicle 1 is performed mainly by the driver's operation on the steering wheel 4. In the manual speed adjustment, a vehicle speed is adjusted mainly by the driver's accelerator operation or brake operation.

Note that the driving-operation support control does not include control for causing the vehicle to automatically travel by forcibly intervening in the driver's driving operation. That is, the manual drive mode does not include control for forcibly intervening in traveling of the vehicle under certain conditions (for example, lane departure of the vehicle and the like) while reflecting a driver's driving operation in traveling of the vehicle within a preset allowable range.

Whereas, the automatic drive mode is, for example, a mode for realizing a driving state of causing the vehicle to automatically travel along a road on which the vehicle travels. The automatic drive mode includes, for example, a driving state of causing the vehicle to automatically travel toward a preset destination without the driver performing a driving operation. The automatic drive mode does not necessarily require all control of the vehicle to be performed automatically, but includes a driving state of reflecting a driver's driving operation in traveling of the vehicle within a preset allowable range. That is, the automatic drive mode includes control for forcibly intervening in traveling of the vehicle under certain conditions while reflecting a driver's driving operation in traveling of the vehicle within a preset allowable range.

An automatic driving control device 5 performs a driving control with the above-mentioned automatic drive mode. The automatic driving control device 5 individually acquires sensing data from a steering sensor 11, an accelerator pedal sensor 12, a brake pedal sensor 13, a GPS receiver 14, a gyroscope sensor 15, and a vehicle speed sensor 16. Then, the automatic driving control device 5 automatically controls traveling of the vehicle 1, based on these pieces of sensing data, route information generated by a navigation system (not shown), traffic information acquired through road-to-vehicle communication, and information obtained from a surrounding monitoring system that monitors a position and movement of surrounding people and vehicles.

The automatic control includes, for example, automatic steering (automatic driving for steering) and automatic speed adjustment (automatic driving for a speed). The automatic steering is a driving state of automatically controlling the steering device 3. The automatic steering includes lane keeping assist (LKA). The LKA automatically controls the steering device 3 such that the vehicle 1 does not depart from a traveling lane, for example, even when the driver does not perform the steering operation. Note that, even during the LKA, the driver's steering operation may be reflected in steering of the vehicle in a range (allowable range) in which the vehicle 1 does not depart from the traveling lane. Moreover, the automatic steering is not limited to the LKA.

The automatic speed adjustment is a driving state of automatically controlling a speed of the vehicle 1. The automatic speed adjustment includes adaptive cruise control (ACC). For example, the ACC is to perform constant speed control to cause constant-speed traveling of the vehicle 1 at a set speed that has been set in advance when there is no preceding vehicle in front of the vehicle 1, and to perform a following control to adjust a vehicle speed of the vehicle 1 in accordance with an inter-vehicle distance from a preceding vehicle when there is a preceding vehicle in front of the vehicle 1. The automatic driving control device 5 decelerates the vehicle 1 in accordance with a driver's brake operation (for example, an operation on the brake pedal) even while executing the ACC. Further, even while executing the ACC, the automatic driving control device 5 can also accelerate the vehicle in accordance with a driver's accelerator operation (for example, an operation on the accelerator pedal) up to a preset maximum allowable speed (for example, a legally defined maximum speed on a road of traveling). Note that the automatic speed adjustment includes not only the ACC but also cruise control (CC) and the like that performs only constant speed control.

Meanwhile, the automatic driving control system of this embodiment includes a drive mode switching control device 6 as a device to switch between the manual drive mode and the automatic drive mode, a driver camera 7 as a first monitoring sensor, a torque sensor 8 as a second monitoring sensor, and an alarm generator 9.

The driver camera 7 is installed at, for example, a position to be front of the driver, such as on a dashboard, captures an image of the driver, and outputs a video signal thereof to the drive mode switching control device 6. The torque sensor 8 is to detect a torque generated when the driver operates the steering wheel 4, and outputs a detection signal thereof to the drive mode switching control device 6. The alarm generator 9 has a speaker and a display, outputs, from the speaker, an audio signal of a message outputted from the drive mode switching control device 6, and displays a display signal of the message on the display.

The drive mode switching control device 6 is to integrally control switching of the drive mode, and is configured as follows.

Figure 2:
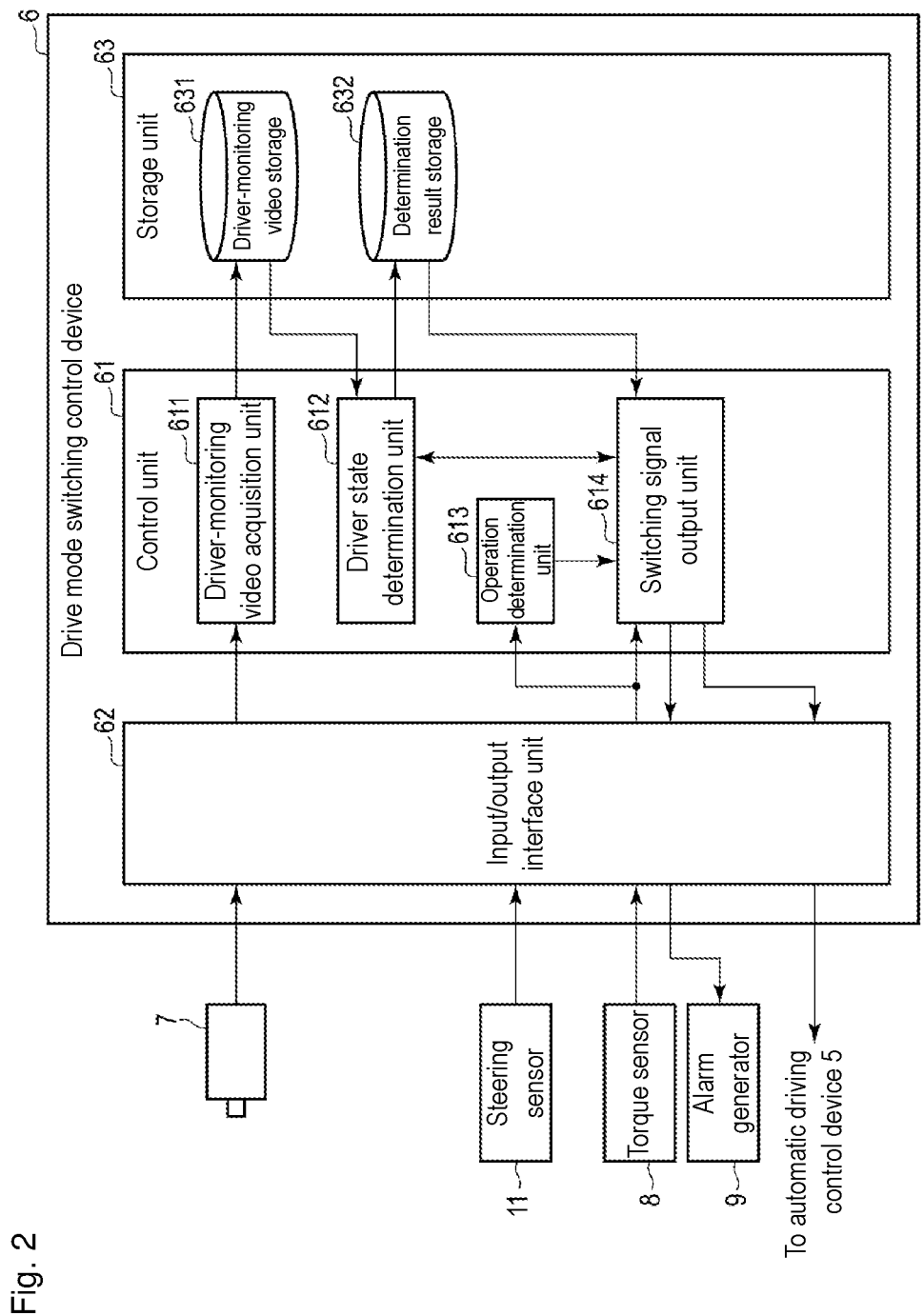
FIG. 2 is a block diagram showing a functional configuration of a drive mode switching control device according to one embodiment of the present invention.

FIG. 2 is a block diagram showing a functional configuration thereof.

That is, the drive mode switching control device 6 includes a control unit 61, an input/output interface unit 62, and a storage unit 63.

The input/output interface unit 62 receives a video signal and a torque detection signal outputted from the driver camera 7 and the torque sensor 8, respectively, and converts the signals into digital data. Similarly, the input/output interface unit 62 receives detection signals as sensing data outputted from the steering sensor 11, the accelerator pedal sensor 12, and the brake pedal sensor 13, respectively, and converts the detection signal into digital data. Further, the input/output interface unit 62 converts a message outputted from the control unit 61 into an audio signal and a display signal, and outputs the signals to the alarm generator 9. Furthermore, the input/output interface unit 62 outputs a switching signal outputted from the control unit 61, to the automatic driving control device 5.

The storage unit 63 uses, as a storage medium, for example, a non-volatile memory capable of writing and reading whenever necessary, such as a solid state drive (SSD) or a hard disk drive (HDD). The storage unit 63 includes a driver-monitoring video storage 631 and a determination result storage 632 as storage areas to be used for implementing the embodiment.

The control unit 61 has a central processing unit (CPU) and a program memory that configure a computer. The control unit 61 includes a driver-monitoring video acquisition unit 611, a driver state determination unit 612, an operation determination unit 613, and a switching signal output unit 614, as control functions required for implementing the embodiment. Note that these control functions are all realized by causing the CPU to execute a program stored in the program memory.

The driver-monitoring video acquisition unit 611 captures, from the input/output interface unit 62, digital data (driver-monitoring video data) of a video signal of the driver outputted from the driver camera 7 above, and causes the driver-monitoring video storage 631 of the storage unit 63 above to store this captured driver-monitoring video data.

The driver state determination unit 612 regularly or irregularly reads driver-monitoring video data from the driver-monitoring video storage 631. Then, at every reading of the driver-monitoring video data, the driver state determination unit 612 performs processing of determining whether or not the driver is in a state of being able to manually perform a driving operation, based on the driver-monitoring video data. For example, the driver state determination unit 612 determines whether or not the driver has closed his eyes, to determine whether or not the driver is in a sleeping state. Then, the driver state determination unit 612 holds information representing a determination result thereof in the determination result storage 632, in association with a time stamp representing determination timing. Meanwhile, the driver state determination unit 612 may acquire sensing data from the driver camera 7 without passing through the input/output interface unit 62 and the driver-monitoring video storage 631.

Based on detection signals outputted from the steering sensor 11 and the torque sensor 8 as in-vehicle sensors capable of detecting a driving operation by the driver, the operation determination unit 613 determines whether an operation performed by the driver is an emergency override operation or a non-emergency override operation. Note that, without limiting to this, the accelerator pedal sensor 12 and the brake pedal sensor 13 can be appropriately used as in-vehicle sensors. Further, the "operation determination unit" may be replaced with an "operation detector". Similarly, processing of "determine whether it is an emergency override operation or a non-emergency override operation" may be replaced with processing of "detect an emergency override operation or a non-emergency override operation".

Here, the operation determination unit 613 may execute the individual processing below.

(1) First detection processing of detecting a driver's override operation, based on a detection signal.

(2) Second detection processing for detecting a value based on an operation amount of a driving operation, based on a detection signal. Note that a value based on an operation amount is, for example, a value at least one of: an operation amount value of a driving operation; an operation speed value obtained by differentiating an operation amount of the driving operation once; or an operation acceleration value obtained by differentiating an operation amount of the driving operation twice. For example, when the detection signal is an output signal of the steering wheel 4, the driving operation is a steering operation, and the operation amount value is a value of a rotation angle $\theta$ of the steering wheel 4. In this case, a value of an operation speed $v$ is a value obtained by differentiating the rotation angle $\theta$ once with time, and a value of operation acceleration $\alpha$ is a value obtained by differentiating the rotation angle $\theta$ twice with time. Note that, as the operation amount, any value corresponding to an operation amount can be used instead of the rotation angle $\theta$. For example, the operation amount may be a displacement $s1=r\theta$ obtained by multiplying the rotation angle $\theta$ [rad] by a radius $r$ of the steering wheel 4, or may be the number of output pulses of the steering sensor 11 before conversion into the rotation angle $\theta$. In addition, when the detection signal is an output signal of the accelerator pedal sensor 12 or the brake pedal sensor 13, similarly to the above, any value corresponding to an operation amount, such as a displacement $s2$ of the accelerator pedal or the brake pedal, can be used as such an operation amount, instead of the rotation angle $\theta$ or the like.

(3) Threshold determination processing of determining whether or not an override operation detected by the first detection processing is an emergency operation, in accordance with whether or not a value based on an operation amount detected by the second detection processing is equal to or more than a threshold value.

Meanwhile, the operation determination unit 613 may include individual units of: a first detector to execute the first detection processing of (1) above; a second detector to execute the second detection processing of (2) above; and a threshold determination unit to execute the threshold determination processing of (3) above, and may be distributed and implemented in those individual units.

The threshold determination processing of (3) above may execute individual processing below.

(3-1) Processing of determining that an override operation detected by the first detection processing is an emergency operation when a value based on an operation amount is equal to or more than a threshold value, and duration in which a value based on the operation amount has been equal to or more than the threshold value is equal to or more than a reference time.

(3-2) Processing of determining that an override operation detected by the first detection processing is not an emergency operation when a value based on an operation amount is equal to or more than a threshold value, and duration in which a value based on the operation amount has been equal to or more than the threshold value is less than a reference time.

(3-3) Processing of determining that an override operation detected by the first detection processing is not an emergency operation when a value based on an operation amount is less than a threshold value.

In a case where a determination result by the operation determination unit 613 is an emergency override operation, the switching signal output unit 614 executes first switching signal output processing of outputting a switching signal for switching the automatic drive mode to the manual drive mode to the automatic driving control device 5, when a determination result by the driver state determination unit 612 immediately before detection of the emergency override operation is that a driver's state is a state of being able to perform a driving operation in the manual drive mode.

Further, in a case where a determination result by the operation determination unit 613 is a non-emergency override operation, the switching signal output unit 614 executes second switching signal output processing of outputting a switching signal to the automatic driving control device 5, when a determination result by the driver state determination unit 612 after detection of the non-emergency override operation is that a driver's state is a state of being able to perform a driving operation in the manual drive mode.

Note that the switching signal output unit 614 may include individual units of a first switching signal output unit to execute the first switching signal output processing and a second switching signal output unit to execute the second switching signal output processing, and may be distributed and implemented in those individual units.

Next, a description is given to an operation of the drive mode switching control device configured as described above.

Figure 3:
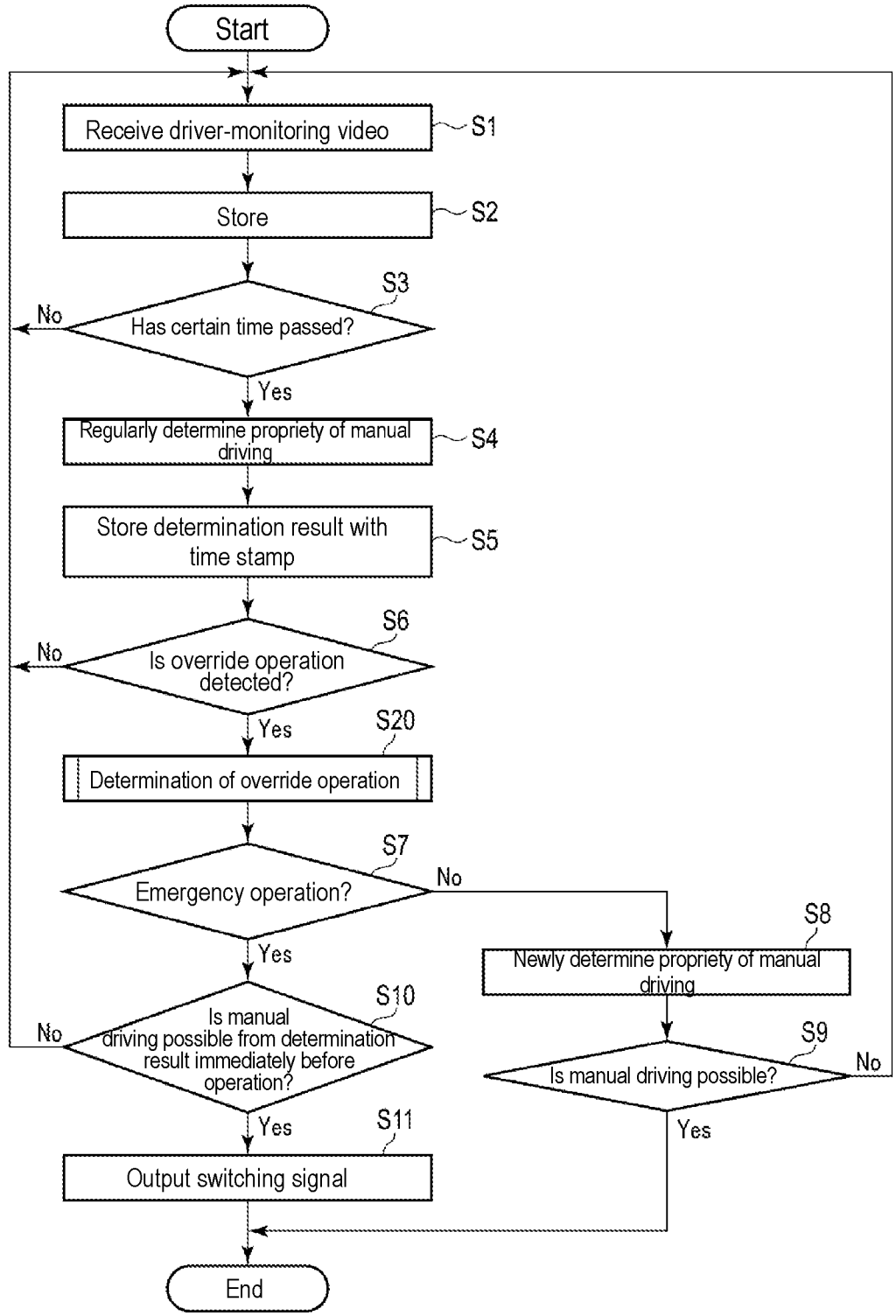
FIG. 3 is a flowchart showing a procedure and control contents of drive mode switching control by the drive mode switching control device shown in FIG. 2.

FIG. 3 is a flowchart showing an entire control procedure and control contents thereof.

(1) Acquisition of Driver-Monitoring Video

When driving is started, the driver camera 7 is activated and continuously captures images of a predetermined range including the driver's face, to output a video signal thereof. In this state, first, under the control of the driver-monitoring video acquisition unit 611, the drive mode switching control device 6 captures, from the input/output interface unit 62, digital data (driver-monitoring video data) of the video signal outputted from the driver camera 7 in step S1, and causes the driver-monitoring video storage 631 of the storage unit 63 to store this captured driver-monitoring video data in step S2.

Meanwhile, the image capturing of the driver may be intermittently performed in a cycle shorter than a determination cycle of the driver state determination unit 612 described later. Further, in the driver camera 7 or the input/output interface unit 62, the video signal may be encoded in accordance with a predetermined encoding method. This makes it possible to save a storage capacity of the driver-monitoring video storage 631 by reducing an information amount of the monitoring video data.

(2) Determination of Driver State

When acquisition of the driver-monitoring video data is started, under the control of the driver state determination unit 612, the drive mode switching control device 6 reads driver-monitoring video data from the driver-monitoring video storage 631 in step S4, at every determination of lapse of a certain time in step S3. Then, from each piece of the read driver-monitoring video data, it is determined whether or not the driver is in a state of being able to manually perform a driving operation.

For example, based on the driver-monitoring video data, an opening state of the driver's eye, blink frequency, eye movement, and the like are detected to recognize a driver's awakening degree. This awakening degree is an example of a concentration degree, and is represented by a numerical value in a range of 0 to 100%. Meanwhile, the concentration degree is not limited to the numerical value within the range of 0 to 100%. For example, a value (flag) of "1" or "0" may be used such as setting "1" when a driver's sight line direction is within a predetermined range, setting "0" when the driver's sight line direction is not within the predetermined range, and the like. Then, for example, by comparing the recognized awakening degree with a threshold value, it is determined whether or not the driver is in a state of being able to manually perform a driving operation.

Then, when the determination result regarding the propriety of the manual driving operation is obtained, the driver state determination unit 612 causes the determination result storage 632 to store information representing the determination result in association with information representing determination timing, for example, time stamp information, in step S5. Additionally, at this time, the driver state determination unit 612 may cause the determination result storage 632 to store the concentration degree used in the determination, in association with the information representing the determination result and the time stamp.

(3) Detection of Override Operation

The drive mode switching control device 6 subsequently executes steps S6 and S20 under the control of the operation determination unit 613. At this time, for example, the steering sensor 11 and the torque sensor 8 as in-vehicle sensors output detection signals in accordance with the driving operation by the driver. The drive mode switching control device 6 determines whether an operation performed by the driver is an emergency override operation or a non-emergency override operation, based on the detection signal corresponding to the driving operation.

For example, under the control of the operation determination unit 613, the drive mode switching control device 6 detects an override operation by the driver based on a detection signal outputted from the torque sensor 8 in step S6. As a result of step S6, the processing returns to step S1 when the override operation is not detected, and the processing proceeds to step S20 when the override operation is detected.

In step S20, under the control of the operation determination unit 613, based on a detection signal outputted from the steering sensor 11, the drive mode switching control device 6 determines whether or not an override operation is an emergency operation as shown in the following steps S21 to S24.

Figure 4:
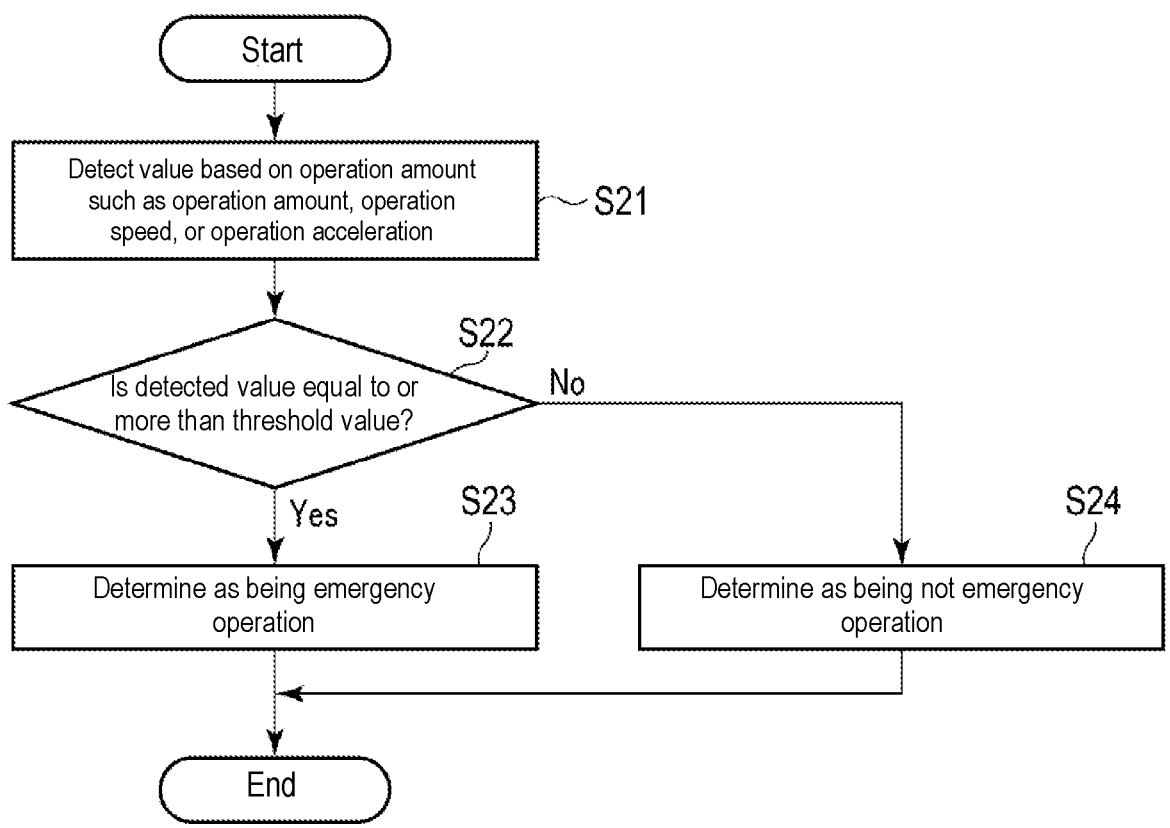
FIG. 4 is a flowchart showing a procedure and control contents of determination of an override operation in the flow shown in FIG. 3.

FIG. 4 is a flowchart showing a control procedure and control contents thereof.

That is, in step S21, based on a detection signal from the steering wheel 4, the operation determination unit 613 detects a value based on an operation amount of the driving operation, such as the rotation angle θ of the steering wheel 4, the operation speed v, or the operation acceleration α. Meanwhile, the value to be detected may simply be at least one of a value of the rotation angle θ, a value of the operation speed v, and a value of the operation acceleration α.

Subsequently, in step S22, the operation determination unit 613 determines whether or not the value detected in step S21 is equal to or more than a threshold value, and determines that the override operation is an emergency operation when the value is equal to or more than the threshold value (step S23). Note that the override operation is not an emergency operation when the value is less than the threshold value as a result of the determination in step S22 (step S24). Thus, the processing of step S20 is completed.

Subsequently, returning to FIG. 3, the drive mode switching control device 6 proceeds to steps S8 and S9 when the override operation is not an emergency operation in step S7 under the control of the operation determination unit 613, and proceeds to step S10 in another case.

(4) Output Control of Switching Signal

After the non-emergency override operation is detected, under the control of the switching signal output unit 614, in step S8, the drive mode switching control device 6 causes the driver state determination unit 612 to newly execute determination similarly to that in step S4. However, while the determination in step S4 is executed regularly, the determination in step S8 is executed irregularly by interruption processing.

When an irregular determination result in step S8 indicates that manual driving is possible in step S9, the switching signal output unit 614 proceeds to step S11 and outputs a switching signal for switching the automatic drive mode to the manual drive mode, to the automatic driving control device 5. When the irregular determination result in step S8 is other than that, the switching signal output unit 614 ends the processing, and the drive mode switching control device 6 returns to step S1.

Whereas, when an emergency override operation is detected, the drive mode switching control device 6 executes step S10 under the control of the switching signal output unit 614. In step S10, the switching signal output unit 614 determines whether or not a regular determination result by the driver state determination unit 612 immediately before detection of the emergency override operation indicates that manual driving is possible, and if not, the processing returns to step S1. In addition, as a result of the determination in step S10, in a case of indicating that manual driving is possible, the switching signal output unit 614 outputs a switching signal for switching the automatic drive mode to the manual drive mode, to the automatic driving control device 5 (step S11). As a result, the automatic driving control device 5 ends the automatic drive mode, and then driving control according to a manual operation of the driver is performed.

As described above in detail, in one embodiment of the present invention, it is regularly or irregularly determined whether or not a driver's state is a state of being able to perform a driving operation in the manual drive mode. Further, it is determined whether an operation performed by the driver is an emergency override operation or a non-emergency override operation. In a case where a determination result by the operation determination unit 613 is the emergency override operation, a switching signal for switching the automatic drive mode to the manual drive mode is outputted when a determination result by the driver state determination unit 612 immediately before detection of the override operation is that a driver's state is a state of being able to perform a driving operation in the manual drive mode. Thus, the determination result immediately before is used, which eliminates necessity of a time for detecting and determining a driver's state after the emergency override operation. Therefore, it is possible to shorten a time from the emergency override operation until outputting a switching signal for the manual drive mode.

Therefore, in the case of an emergency override operation, a time from the override operation until switching to the manual drive mode can be shortened.

Further, when a non-emergency override operation is detected, a switching signal for switching the automatic drive mode to the manual drive mode is outputted based on a determination result by the driver state determination unit 612 after detection of the non-emergency override operation. Thus, in a case of non-emergency, since a driver's state can be detected and determined after the non-emergency override operation, it is possible to switch from the automatic drive mode to the manual drive mode after confirming the latest state of the driver.

Further, an override operation by the driver is detected, a value based on an operation amount of the driving operation is detected, and it is determined whether or not an override operation is an emergency operation in accordance with whether or not a value based on the operation amount is equal to or more than a threshold value. This enables discrimination as to whether or not an override operation is an emergency operation in accordance with magnitude of a value based on the operation amount of the driving operation.

Furthermore, when a value based on an operation amount is less than the threshold value, it is determined that an override operation detected by the operation determination unit 613 is not an emergency operation. This can give time allowance for newly confirming the propriety of manual driving, when the driver slowly and carefully performs the override operation.

Further, as a value based on an operation amount, there is used a value at least one of: an operation amount value of a driving operation; an operation speed value obtained by differentiating an operation amount of the driving operation once; or an operation acceleration value obtained by differentiating an operation amount of the driving operation twice. This enables determination as to whether or not an override operation is an emergency operation based on a specific numerical value.

Other Embodiments

It should be noted that the present invention is not limited to the above embodiment. For example, the flowchart shown in FIG. 4 may be modified as shown in FIG. 5. That is, step S22a may be further performed between steps S22 and S23. In this case, when the determination result in step S22 is equal to or more than a threshold value, the operation determination unit 613 determines whether or not duration in which a value detected in step S21 has been equal to or more than the threshold value is equal to or more than a reference time (step S22a). As a result of the determination in step S22a, when the duration is equal to or more than the reference time, the operation determination unit 613 determines that the override operation is an emergency operation (step S23). Meanwhile, as a result of the determination in step S22a, when the duration is less than a reference time, the operation determination unit 613 determines that the override operation is not an emergency operation (step S24).

Therefore, when the determination result in step S22a indicates the reference time or more, it is possible to detect an emergency operation continued for the reference time or more, as an emergency override operation. In addition, when the determination result in step S22a indicates less than the reference time, for example, a temporary erroneous operation caused by the driver's elbow colliding with the steering wheel for a moment is not to be detected as an emergency override operation.

Other embodiments further include the following, for example.

In the one embodiment described above, as an example, a description has been given to a case of using a video signal including the driver's face obtained by the driver camera 7, as a way to determine a driver's state. However, the present invention is not limited to this. For example, based on a biometric signal obtained by a biometric sensor, for example, a driver's pulse wave signal or heart rate signal detected by a pulse wave sensor or a heart rate sensor, or a signal representing up and down movement of the diaphragm detected by a pressure sensor, a driver's state may be determined. Alternatively, as a way to determine a driver's state, by using a steering torque of the driver's steering operation detected by the torque sensor 8, it may be determined that the driver is in a state of being able to perform a manual driving operation when a torque equal to or more than a predetermined value is detected. Without limiting to this, a driver's state may be determined using an operation input unit that allows the driver to input that the manual driving operation has become possible, such as a push button provided on the steering wheel 4, and a soft button provided on the touch panel. Besides, it is also possible to use an operation of the accelerator pedal or the like.

In addition, regarding a type of the vehicle, a function of the automatic driving control device, a control function, control procedure, control contents, and the like of the drive mode switching control device, various modifications can be made without departing from the subject matter of the present invention.

That is, the present invention is not limited to the above one embodiment, and can be variously modified in an implementation phase without departing from the subject matter of the present invention. In addition, individual embodiments may be implemented in combination as appropriate as possible, and in this case, a combined effect is obtained. Furthermore, various inventions can be extracted by an appropriate combination of a plurality of constituent elements disclosed in the above one embodiment.

Some or all of the above embodiments may be described as in the following supplementary notes, but are not limited to the following.

(Supplementary Note 1)

A drive mode switching control device for switching a drive mode of a vehicle from an automatic drive mode to a manual drive mode, the drive mode switching control device including:

a memory to store a determination result obtained by determining whether an operation performed by a driver is an emergency override operation or a non-emergency override operation; and at least one hardware processor connected to the memory, in which the at least one hardware processor:

acquires sensing data representing a state of a driver from a monitoring sensor that is for monitoring of a state of the driver;

performs, based on the acquired sensing data, regular determination or irregular determination as to whether or not a state of the driver is a state of being able to perform a driving operation in the manual drive mode, and holds a determination result thereof in the memory;

determines whether an operation performed by the driver is an emergency override operation or a non-emergency override operation, based on a detection signal outputted from an in-vehicle sensor capable of detecting a driving operation by the driver;

outputs, in a case where this determination result is the emergency override operation, a switching signal for switching the automatic drive mode to the manual drive mode when a result of the regular determination immediately before detection of the emergency override operation is that a state of the driver is a state of being able to perform a driving operation in the manual drive mode; and outputs, in a case where this determination result is the non-emergency override operation, the switching signal when a result of the irregular determination after detection of the non-emergency override operation is that a state of the driver is a state of being able to perform a driving operation in the manual drive mode.

(Supplementary Note 2)

A drive mode switching control method executed by a device for switch of a drive mode of a vehicle from an automatic drive mode to a manual drive mode, the drive mode switching control method including:

an acquisition process, by using at least one hardware processor, to acquire sensing data representing a state of a driver from a monitoring sensor that is for monitoring of a state of the driver;

a driver state determination process, by using at least one hardware processor, based on the acquired sensing data, to regularly or irregularly determine whether or not a state of the driver is a state of being able to perform a driving operation in the manual drive mode, and hold a determination result thereof in at least one memory;

an operation determination process, by using at least one hardware processor, to determine whether an operation performed by the driver is an emergency override operation or a non-emergency override operation, based on a detection signal outputted from an in-vehicle sensor capable of detecting a driving operation by the driver;

a first switching signal output process, by using at least one hardware processor, to output a switching signal for switching the automatic drive mode to the manual drive mode when a determination result by the driver state determination process immediately before detection of the emergency override operation is that a state of the driver is a state of being able to perform a driving operation in the manual drive mode, in a case where a determination result by the operation determination process is the emergency override operation; and a second switching signal output process, by using at least one hardware processor, to output the switching signal when a determination result by the driver state determination process after detection of a non-emergency override operation is that a state of the driver is a state of being able to perform a driving operation in the manual drive mode, in a case where a determination result by the operation determination process is the non-emergency override operation.

The invention claimed is:

1. A drive mode switching control device for switching a drive mode of a vehicle from an automatic drive mode to a manual drive mode, the drive mode switching control device comprising a processor configured with a program to perform operations comprising:

operation as an acquisition unit configured to acquire sensing data representing a state of a driver from a monitoring sensor configured to monitor the state of the driver;

operation as a driver state determination unit configured to regularly or irregularly determine, based on the acquired sensing data, whether the state of the driver is a state of being able to perform a driving operation in the manual drive mode and produce a determination result thereof, and hold the determination result;

operation as an operation determination unit configured to determine whether an operation performed by the driver is an emergency override operation or a non-emergency override operation, based on a detection signal outputted from an in-vehicle sensor configured to detect a driving operation by the driver;

operation as a first switching signal output unit configured to output a switching signal for switching the automatic drive mode to the manual drive mode in response to the determination result by operation as the driver state determination unit, before detection of the emergency override operation, being that the state of the driver is the state of being able to perform the driving operation in the manual drive mode, in a case where the determination result by operation as the operation determination unit is the emergency override operation; and operation as a second switching signal output unit configured to output the switching signal in response to the determination result by operation as the driver state determination unit, after detection of the non-emergency override operation, being that the state of the driver is the state of being able to perform the driving operation in the manual drive mode, in a case where the determination result by operation as the operation determination unit is the non-emergency override operation, wherein the processor is configured with the program to perform operations such that operation as the operation determination unit comprises:

operation as a first detector configured to detect an override operation by the driver based on the detection signal;

operation as a second detector configured to detect a value based on an operation amount of the driving operation based on the detection signal; and operation as a threshold determination unit configured to determine whether the override operation detected by operation as the first detector is an emergency operation, in accordance with whether the value based on the operation amount detected by operation as the second detector is equal to or more than a threshold value, and the value based on the operation amount comprises an operation acceleration value obtained by differentiating an operation amount of the driving operation twice.

2. The drive mode switching control device according to claim 1, wherein the processor is configured with the program to perform operations such that, in response to the value based on the operation amount being equal to or more than the threshold value, and a duration in which the value based on the operation amount is equal to or more than the threshold value being equal to or more than a reference time, operation as the threshold determination unit comprises determining that the override operation detected by operation as the first detector is an emergency operation.

3. The drive mode switching control device according to claim 1, wherein the processor is configured with the program to perform operations such that operation as the threshold determination unit comprises determining that the override operation detected by operation as the first detector is not an emergency operation, in response to the value based on the operation amount being equal to or more than the threshold value, and a duration in which the value based on the operation amount is equal to or more than the threshold value being less than a reference time.

4. The drive mode switching control device according to claim 1, wherein the processor is configured with the program to perform operations such that operation as the threshold determination comprises determining that the override operation detected by operation as the first detector is not an emergency operation in response to the value based on the operation amount being less than the threshold value.

5. A drive mode switching control method executed by a device for switching of a drive mode of a vehicle from an automatic drive mode to a manual drive mode, the drive mode switching control method comprising:

acquiring, by the device, sensing data representing a state of a driver from a monitoring sensor configured to monitor the state of the driver;

determining, by the device, based on the acquired sensing data, regularly or irregularly whether the state of the driver is a state of being able to perform a driving operation in the manual drive mode, and produce a determination result thereof, and hold the determination result;

determining, by the device, whether an operation performed by the driver is an emergency override operation or a non-emergency override operation, based on a detection signal outputted from an in-vehicle sensor configured to detect a driving operation by the driver;

outputting, by the device, a switching signal for switching the automatic drive mode to the manual drive mode in response to the determination result, before detection of the emergency override operation, being that the state of the driver is the state of being able to perform the driving operation in the manual drive mode, in a case where the determination result is the emergency override operation; and outputting, by the device, the switching signal in response to the determination result after detection of the non-emergency override operation that the state of the driver is the state of being able to perform the driving operation in the manual drive mode, in a case where the determination result is the non-emergency override operation, wherein the determining whether the operation performed by the driver is the emergency override operation or the non-emergency override operation comprises:

detecting an override operation by the driver based on the detection signal;

detecting a value based on an operation amount of the driving operation based on the detection signal; and determining whether the detected override operation is an emergency operation, in accordance with whether the detected value based on the operation amount is equal to or more than a threshold value, and the value based on the operation amount comprises an operation acceleration value obtained by differentiating an operation amount of the driving operation twice.

6. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 1.

7. The drive mode switching control device according to claim 2, wherein the processor is configured with the program to perform operations such that operation as the threshold determination unit comprises determining that the override operation detected by operation as the first detector is not an emergency operation, in response to the value based on the operation amount being equal to or more than the threshold value, and the duration in which the value based on the operation amount is equal to or more than the threshold value being less than a reference time.

8. The drive mode switching control device according to claim 2, wherein the processor is configured with the program to perform operations such that operation as the threshold determination unit comprises determining that the override operation detected by operation as the first detector is not an emergency operation in response to the value based on the operation amount being less than the threshold value.

9. The drive mode switching control device according to claim 3, wherein the processor is configured with the program to perform operations such that operation as the threshold determination unit comprises determining that the override operation detected by operation as the first detector is not an emergency operation in response to the value based on the operation amount being less than the threshold value.

10. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 2.

11. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 3.

12. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 4.

13. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 7.

14. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 8.

15. A non-transitory computer-readable storage medium storing a program, which when read and executed, causes a computer to perform operations comprising operation as the acquisition unit, operation as the driver state determination unit, operation as the operation determination unit, operation as the first switching signal output unit, and operation as the second switching signal output unit in the drive mode switching control device according to claim 9.

* * * * *